Dec. 28, 1965 H. H. ADELAAR 3,226,483

RESONANT TRANSFER TIME DIVISION MULTIPLEX SYSTEM
USING TRANSISTOR GATING CIRCUITS
Filed Nov. 10, 1961

Inventor
H.H. ADELAAR
By [signature]
Attorney

United States Patent Office 3,226,483
Patented Dec. 28, 1965

3,226,483

RESONANT TRANSFER TIME DIVISION MULTIPLEX SYSTEM USING TRANSISTOR GATING CIRCUITS

Hans H. Adelaar, Antwerp, Belgium, assignor to International Standard Electric Corporation, New York, N.Y., a corporation of Delaware Filed Nov. 10, 1961, Ser. No. 151,562
Claims priority, application Netherlands, Dec. 1, 1960, 258,572
12 Claims. (Cl. 179—15)

Figures 1, 2:
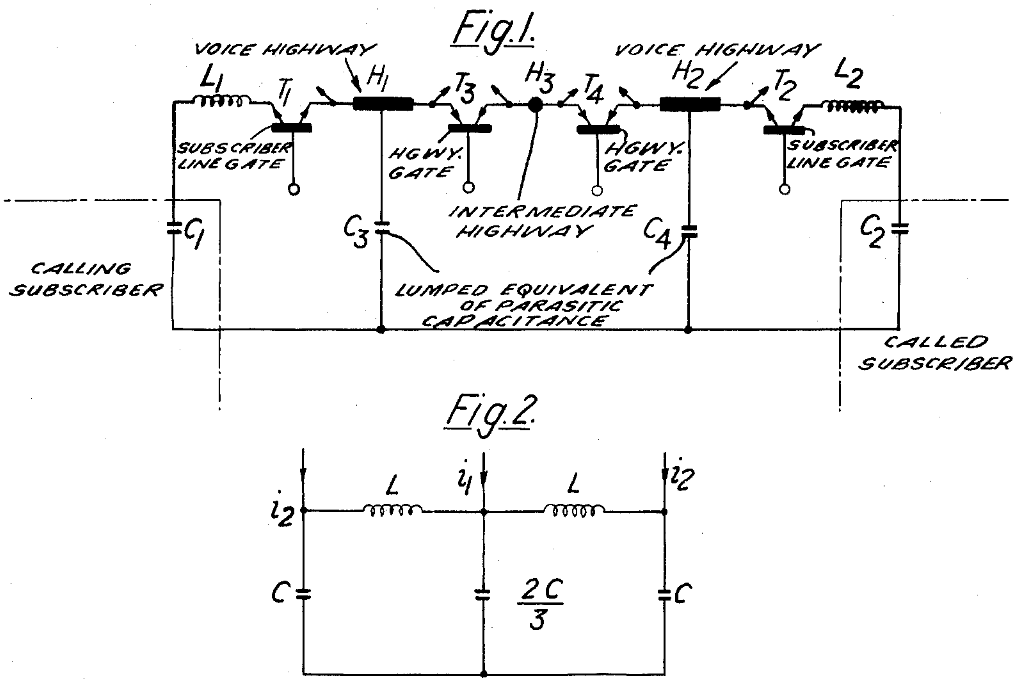

The invention relates to a telecommunication system using transistor gates, each communication path extending over a series of said transistor gates. Such a system is known for instance from the Belgian Patent No. 558.179 to K. Cattermole et al., now also U.S. Patent No. 3,073,903.

This system particularly shows how connections may be established in an electronic telephone exchange over a plurality of gates cascaded along a communication path and these gates consisting in a symmetrical transistor whose base is used as control point whereby the transistor may be made conductive during a short recurrent time slot alotted to the communication in a time division multiplex system. The above Belgian patent shows that the transistor gates are used to establish communications on a pulse amplitude modulation basis with the help of so-called resonant transfer circuits. In this, a capacitance constituted by the last shunt condenser of a subscriber low-pass filter circuit which faces the time division multiplex highway, or made up of a combination of condensers part of said filter, exchanges its charge with that of the corresponding condenser part of the low-pass filter at the other end of the communication path. The connecting path between the two condensers includes one or more cascaded multiplex highways, one or more transistor gates and one or more inductances which form a series resonant circuit with the condensers whose natural period is twice the interconnecting time during which the transistor gates are made conductive. The Belgian patent particularly discloses a communication system based on this principle and wherein the exchange of the condenser charges can be successfully carried out despite the multiplex highway or other elements producing a capacitance to ground which as a first estimation may be assumed to be represented by an equivalent shunt condenser located half-way between the two low-pass filter condensers.

In such a system, and in fact in all time division multiplex communication systems, control pulses at a sampling frequency will be regularly applied, e.g. every 100 microseconds with a sampling frequency of 10 kc./s., to the bases of the transistors constituting the gates intervening in the communication path to be established on a pulse amplitude modulation basis. These pulses will generally be current pulses applied with the help of a control network from high impedance sources to the transistor bases. These current pulses at the sampling frequency will produce signals on the communication path between two subscribers and accordingly the low-pass filters associated with the subscribers for the purpose of correctly demodulating the pulse amplitude modulated signals on the highways, will have to be designed so that they will sufficiently attenuate the sampling frequency signals appearing on the communication path, so that the level of the sampling frequency at the subscriber's set will be sufficiently low, e.g. —75 dbm or 75 db below 1 milliwatt. If the sampling frequency component appearing on the communication path is appreciable, a substantial attenuation will have to be provided by the low-pass filter, e.g. an attenuation pole of the latter involving a coil and a condenser will have to be located at or relatively near the sampling frequency. Yet, particularly for low-pass filters to be used in conjunction with the resonant transfer circuits whose principle is recalled above, such location of an attenuation pole may not lead to the best overall transmission performance, or alternatively, the filter may have to include additional elements whose main function will be to satisfactorily attenuate the sampling frequency component. Especially, when used in large quantities, e.g. for subscriber lines in a telephone exchange, it is obviously desirable to realize an optimum design of the low-pass filter, using as few elements as possible for the performance required, and to avoid complicating the requirements to be imposed on the filter design.

Also, the current bursts to unblock the transistor gate will produce D.C. components across the storage condensers and the highway capacitance or additional swamping condensers used in the communication path. Thus D.C. voltages will be applied to the low-pass filters and this is generally undesirable. This swamping effect is fully explained in the above mentioned Cattermole Patent 3,073,903. Briefly, that explanation may be summarized in the following manner. Generally speaking, a communication highway has capacitance distributed along the length thereof. Electrically, this capacitance corresponds to an equivalent lumped capacitance connected in the middle of a resonant transfer network. The equivalent lumped capacitance is smaller than two-thirds of the end capacitance, and it has variations from highway to highway. If a physical capacitance which is bigger than the equivalent capacitance is added to the middle of the network, it will swampout these variations and tend to bring uniformity to the highway capacitances.

The general object of this invention is to realize a telecommunication system using transistor gates such as the above described system, wherein the control signals used to unblock the transistor gates do not lead to undesired signals being introduced in the communication path.

Another object of the invention is to avoid this defect by mutual cancellation of the signals produced in the communication path by control signals applied to different transistor gates.

In accordance with a characteristic of the invention, a telecommunication system as defined at the beginning of this description is characterized in that said transistors and the switching currents controlling their unblocking are so chosen that one or more closed D.C. loops involving two or more transistors pertaining to different gates are produced for said switching currents whereby said switching currents do not create any substantial D.C. or A.C. signals on said communication path.

In accordance with another characteristic of the invention, said closed D.C. loops include at least a pair of complementary type transistors pertaining to distinct transistor gates.

It is to be remarked that transistor gates of such a design are already known that the signals controlling the state of conductivity of the transistors introduce substantially no signals in the communication path. As disclosed for instance in the Belgian Patent No. 541,098 and in the U.S. Patent No. 2,936,338, these gates may include two transistors with their emitters commoned and with the collectors constituting the in and out terminals of the gate respectively. In the Belgian patent the two transistors are of opposite conductivity type while in the U.S. patent they are of the same conductivity type, the bases being in that case also commoned and the control signal being applied between the commoned emitters and the commoned bases. These arrangements suffer however, from the disadvantage that the number of transitsors per gate is doubled with regard to a gate constituted by a single symmetrical junction transistor.

In accordance with yet another characteristic of the invention, each communication path established over the series of said transistor gates includes an even number of transistors, a transistor of one conductivity type alternating with a transistor of the other conductivity type save for the two middle transistors which are of the same type.

In this manner, it will be possible to realize communication paths using transistor gates and offering the advantages mentioned, while symmetrical communication paths are established with the advantage that single transistor gates, i.e. subscriber line gates may be used. Indeed, going from the two subscriber ends the transistors are always of the same conductivity type.

The above and other objects and features of the invention and the invention itself will be better understood from the following description of detailed embodiments of the invention to be read in conjunction with the accompanying drawings which represent:

FIG. 1, a communication path using transistors in accordance with the invention;

FIG. 2, the equivalent electrical network for a modified version of FIG. 1; and

Figure 3:
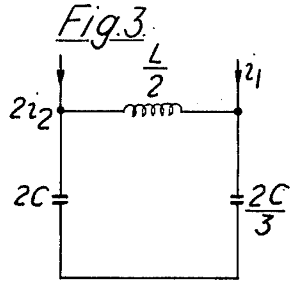

FIG. 3, an equivalent electrical circuit for the network of FIG. 2, when fed symmetrically.

FIG. 1 shows a communication path which is particularly adapted to time division multiplex telecommunication systems using the resonant transfer principle. Two telecommunication subscribers may have their line circuits (not shown) terminating on the exchange side by a filter (also not shown) which ends into a shunt condenser such as $C_1$ for one subscriber and $C_2$ for the other. Alternatively, these condensers may be made up of several condensers part of the low-pass filter and which at the relatively high frequency of the resonant transfer can be considered as forming a combination. The condensers such as $C_1$ and $C_2$ are connected to the respective subscriber line gates constituted by the symmetrical junction transistor $T_1$ and $T_2$. These connections are made through series inductances $L_1$ and $L_2$ respectively.

The subscriber's line circuits are arranged into groups, e.g. 100, which have their transistor gates multipled together on the exchange side of the gate. The multipling point constitutes a so-called highway or time division multiplex link since a plurality of transistors such as $T_1$ connected to this highway may be rendered conductive simultaneously but only during distinct time slots. Additional gates must then be provided to interconnect any pair of highways such as $H_1$ and $H_2$ in order to establish a desired communication on a time division multiplex basis, using pulse amplitude modulation. For relatively large telecommunication exchanges, this interconnection of the highways may preferably be made in accordance with the system of the copending U.S. patent application S.N. 63,203, filed on October 17, 1960, entitled "Interconnecting Network for a Telecommunication System," H. Adelaar, wherein the subscriber group highways are multipled in various combinations to so-called intermediate highways. One of these, i.e. $H_3$, is shown in the figure to be connected to highway $H_1$ through the transistor gate $T_3$ and to the highway $H_2$ through the transistor gate $T_4$. By simultaneously unblocking the normally blocked transistors $T_1$, $T_3$, $T_4$ and $T_2$, a communication may thus be established between the two subscribers by a resonant transfer of the voltages respectively present across condensers $C_1$ and $C_2$ at the time the four transistors are made conductive. With $L_1C_2=L_2C_2$, and particularly with equal values of condensers and inductances, the voltages across $C_1$ and $C_2$ will be interchanged at the end of the time interval during which the four transistors are simultaneously made conductive, provided this interval is chosen equal to half the natural period of the series resonant circuit so established.

The interconnecting highways such as $H_1$, $H_3$ and $H_2$ shown in the drawing will generally introduce parasitic elements mainly constituted by parasitic capacitances. In the drawing, it has been shown that the highways $H_1$ and $H_2$, which are the group highways and may each be constituted by a length of coaxial cable to interconnect the subscriber groups to the central interconnecting network involving the transistor gates such as $T_3$ and $T_4$ and the intermediate highway such as $H_3$, introduce a capacitance to ground which may be represented by the lump condensers $C_3$ (for highway $H_1$) and $C_4$ (for highway $H_2$). This would normally disrupt the resonant energy transfer, but it has been shown in the Belgian Patent No. 558,179, that provided $C_3+C_4=C_1+C_2/4n^2-1$ where $n$ is any integer, the resonant transfer will be carried out as if the central capacitance $C_3+C_4$ was not present, the voltages across the condensers $C_1$ and $C_2$ of equal value being again interchanged at the end of the switching time while any voltage, e.g. zero, initially present across the central capacitance $C_3+C_4$ is again there at the end of the switching time.

FIG. 1 shows that the end bilateral or symmetrical junction transistors $T_1$ and $T_2$ are of the NPN type, whereas the central interconnecting transistors $T_3$ and $T_4$ are PNP bilateral or symmetrical junction transistors. All four transistors are controlled by suitable current pulses injected at the bases and provided all these current pulses are alike, the control signals at the sampling frequency, e.g. 10 kc./s., will not introduce D.C. or A.C. signals on the highways.

FIG. 2 helps to show how the effect of the control pulses on the signalling path may be suitably compensated in a more general manner. FIG. 2 represents the equivalent electrical network of a modified version of FIG. 1 in which the two inductances ($L_1$, $L_2$) are now displaced on the highway ($H_1$, $H_2$) side of the transistor gates ($T_1$, $T_2$), when the four transistors are conductive and are assumed to constitute ideal switches, the three electrodes of the transistors being taken as equipotential points. The inductances L represent the equal inductance value of $L_1$ and $L_2$, the condensers C represent the equal capacitance values of $C_1$ and $C_2$, while the middle condenser $2C/3$ represents the total capacitance of $C_3+C_4$, assuming that the lowest even harmonic, i.e. the second with $n$ equal to unity, is used to determine the values of the central capacitance which will permit resonant transfer to be carried out as if that central capacitance was not present.

Considering first the case of a current source injecting a current $i_1$ at the centre of the network, as shown in FIG. 2, to evaluate the effect of this current injection, the equivalent circuit of FIG. 3 may be used since the series resonant branches of FIG. 2 have the same resonant frequency.

Thus in FIG. 3, the current $i_1$ is injected into a dipole comprising the condenser $2C/3$ shunted by the series resonant circuit consisting of an inductance $L/2$ in series with a condenser 2C.

The current $i_1$ may be the resultant base current injected at the central part of the network of FIG. 1, i.e. the algebraic sum of the base currents applied to transistors $T_3$ and $T_4$.

It may be verified e.g. when the applied current $i_1$ is a linear function of time, that the voltage produced at the centre of the network across the equivalent condenser $2C/3$ as well as the voltages across the condensers C, when the switching current subsides at the end of the switching time, will all be equal to the voltage which this current $i_1$ would produce if applied during said switching time to a condenser having the total capacitance of the condenser shown, i.e. $8C/3$. Thus, in the single mesh equivalent circuit of FIG. 3, where the resonant frequency is an even harmonic, i.e. twice the fundamental transfer resonance frequency, the voltages across $2C/3$ and 2C at the end of the switching time are the same as would be obtained if the impedance $L/2$ had been short-circuited during that time.

If V is the value of the three voltages thus produced at the end of the switching time by the aggregate switching current $i_1$ at the centre of the network it may also be shown that if $i_2$ are like switching currents simultaneously injected at both ends of the network, i.e. at the unconnected plates of the two C condensers in FIG. 2, the combined effect of these two $i_2$ currents will be exactly the same as the effect of the current $i_1$ at the centre provided $i_1=2i_2$.

Indeed, for the simultaneous injection of the two $i_2$ currents into the circuit of FIG. 2, the equivalent network of FIG. 3 may also be used with a current $2i_2$ now being injected at the junction point of condenser 2C with inductance $L/2$. The same reasoning as before may be made and at the end of the switching time thus equal to the natural period of the single mesh series resonant circuit of FIG. 3, the voltages across the condensers 2C and $2C/3$ will be both equal to V provided $2i_2=i_1$.

If the effect of $i_2$ is considered singly, i.e. at one end only, for the network of FIG. 2; it may be verified, e.g., when the current applied is a linear function of time, that at the end of the switching time the voltage across the condenser $2C/3$ will be equal to $V/2$, V being again the voltage which would be obtained by charging a condenser having a total value of $8C/3$ by the current $i_1$ during the switching time. But the voltage across the left-hand C condenser, i.e. $C_1$ of FIG. 1, will be equal to $V/2-V'$ while the voltage across the right-hand condenser, i.e. $C_2$ of FIG. 1, will be equal to $V/2+V'$ V' being the voltage which would be produced by said $i_2$ current across an inductance L at the end of the switching time. For instance $V'=kIL$ where I is the initial switching current and $k$ is the rate of linear decrease of this switching current and if the $k$IL products are the same, it is seen that for the case of linearly varying currents injected at both ends one may secure the same voltage V across all three condensers of FIG. 2.

To take a practical example, it has been shown in the Belgian Patent No. 558,179 that the energy storage condensers $C_1$ and $C_2$ used in the resonant transfer should be equal to the sampling period divided by twice the terminating resistance as seen on the side of the condenser. With a sampling period of 100 microseconds and a terminating resistance of 2000 ohms, the value of C would therefore be of 25,000 pf. and this may go up to 27,000 pf. when the structure of the low-pass filter adds some small amount of additional capacitance to the terminating condenser C on the side of the transfer inductance. Using the second harmonic for computing the value of the central capacitance, the latter should therefore be equal to 18,000 pf. and the total capacitance is consequently 72,000 pf.

Assuming a linearly decreasing switching current since it has been found that to obtain good switching characteristics for the gate transistors, the base current should be high at the front edge and low at the trailing edge, one may have an initial base current $i_2=40$ ma. and falling off linearly to 10 ma. after a switching time of 2 microseconds. Then the voltage produced by four base currents of same sign at the end of each switching time of 2 microseconds, is readily found to be equal to 2.78 volts.

Hence, if no compensation was used, such a D.C. voltage appearing on the highway could lead to distortion in practical circuits. Moreover, with transistors of the same type, the currents flowing through the different transistor switches would increase or decrease gradually from the electrical midpoint of the highway to the transmission ends depending on the conductivity type of the transistors used.

Also, for an arrangement as in FIG. 1 but with the same type of transistors for the four transistor gates involved in a communication, assuming the figures given above, there would be a 10 kc./s. (sampling frequency) signal of 0.885 volt on the highway and to secure say a level of $-75$ dbm for this sampling frequency signal at the subscriber set, the low pass network would have to provide an attenuation of 68 db at this frequency. This imposes a special requirement on the filter which if removed could generally permit a better filter design for a given cost and volume of the latter.

When opening the transistor switches, a certain base charge must be evacuated from the base. This charge flows through the highway and produces a voltage on it.

To take care of residual charges on the highway after each effective switching time for each time slot, these effective switching times, e.g. of 2 microseconds, are usually separated by guard time intervals, e.g. also of 2 microseconds, during which clamping circuits may discharge the highway capacitance.

If transistors of both the NPN and PNP conductive types are used, the task of these clamping circuits will however be easier and of course, all the disadvantages mentioned above with regard to the D.C. or A.C. signals produced on the highway by the switching base currents will disappear. These opposite conductive type transistors would, of course, be used as shown in FIG. 1.

In connection with the residual base charge after cutting off the transistor switches, this will be modulated by the collector current with non-ideal transistors and may give rise to adjacent channel crosstalk. With opposite conductive type transistors having identical characteristics, the cancellation of the modulated base charges may be secured if the complete base charge is always evacuated to the highway. Then the resulting voltage on the latter will be zero. In this respect the circuit of FIG. 1 where transfer inductances are located on the subscriber's side of the line switching transistors $T_1$ and $T_2$, is particularly advantageous to permit at least a partial cancellation of the modulated base charge (when the transistors do not have identical characteristics). Indeed, the transfer inductances $L_1$ and $L_2$ of FIG. 1 act as high impedance paths at the frequencies involved whereby the complete base charges of the transistors must be evacuated to the highway.

While FIG. 1 shows a preferred arrangement in which closed D.C. loops for the transistor base switching currents are particularly convenient to realize, it should be appreciated that many other communication paths may be designed so as to secure the advantages previously mentioned. If the communication path is such, for instance in relatively smaller communication exchanges that it may be deemed preferable to perform the interconnection of two highways such as $H_1$ and $H_2$ with the help of a single interconnecting transistor instead of two cascaded transistors as shown in FIG. 1, one may still secure adequate compensation by using an interconnecting transistor which is of opposite conductive type with regard to the line transistors $T_1$ and $T_2$ and for which the base current has twice the magnitude of the individual base currents for the transistors $T_1$ and $T_2$. Alternatively, a combination of two like transistors combined in series as in FIG. 1, or in parallel, may be used to realize each highway interconnecting gate. This offers the disadvantage of doubling the number of transistors per gate, but this drawback is incurred only for the highway interconnecting transistors which are far less numerous than the line gate transistors.

On the other hand, the transistors such as $T_3$ or $T_4$ may be used to interconnect the highways such as $H_1$ and $H_2$ to separate secondary highways (not shown) which must then still be interconnected with one another by a further gate. In this case, for each intercommunication path, the number of cascaded gates climbs from four to five instead of going down to three. It will then be advantageous to keep to the schema of FIG. 1 alternating NPN with PNP transistors for the four outer transistors but to use for the fifth and central transistor gate (not shown) a two-transistor arrangement of the type disclosed in the U.S. Patent No. 2,936,338 or the Belgian Patent No. 547,098 previously referred to and in which gates the base currents find internal closed loops without producing a charge in the highway. Again, these central gates will be very few in number as compared to the total number of gates involved in the network and there is no consequent disadvantage in having to use two transistors for these gates only.

Apart from the use of special switches, or different base currents or base charges, cancellation of the switching effects may yet be obtained by the use of a separate pulse source applied directly to the highway. It is not absolutely essential that at the two ends of the communication path of FIG. 1, the number of transistors and their type should be the same. But the algebraic sum of the base currents at one end of the path should be equal to the sum at the other end. Preferably, this sum should be a linear function of time during the switching pulse. Preferably also, this should be the case for the algebraic sum of the base currents of the transistors at the middle of the transmission path, the algebraic sum of the charges produced by all these base currents being equal to zero.

While the principles of the invention have been described above in connection with specific apparatus, it is to be clearly understood that this description is made only by way of example and not as a limitation on the scope of the invention.

I claim:

1. A time division multiplex telephone system comprising a communication path including at least one voice highway, gate means connected to opposite ends of said highway, each of said gate means comprising a single transistor having a base electrode for control and emitter-collector electrodes for transmitting voice signals along said communication path, and means for selectively biasing the base electrodes of each of said transistors to switch said gate means "off" and "on," said last named means comprising D.C. loops extending from one of said gate means over the associated highway to the other of said gate means.

2. The system of claim 1 wherein the transistor in the gate on one end of said highway is a first conductive type and the transistor in the gate on the opposite end of said highway is an opposite conductive type.

3. The system of claim 2 and means whereby the biasing potentials applied to the base electrodes of said transistors have an algebraic sum equal to zero.

4. The system of claim 1 wherein said communication path comprises an even number series of transistor gate circuits, said transistors being of alternate conductive types, and the middle two transistors of said series being of the same conductive type.

5. The system of claim 1 wherein said communication path comprises an odd number series of gate circuits, all of said gate circuits comprising a single transistor except for the middle gate in said series which comprises two transistors.

6. The system of claim 1 and means wherein said communication path comprises a series of gate circuits, said series including $4n-1$ gates where $n$ is any positive integer, means whereby the two gates in the middle of said series have the same conductive type and the two gates adjacent said middle gates have an opposite conductive type.

7. The system of claim 1 wherein said communication path comprises a series of $4n+1$ gate circuits where $n$ is any positive integer, means whereby all except the middle in said series of said gate circuits comprise a single transistor, said middle gate comprising a pair of transistors of opposite conductive type, and means whereby the gate circuits which are symmetrically disposed on opposite sides of said middle gate are of the same conductive type, each stage in said series having a transistor of a conductive type which is opposite to the conductive type of the next adjacent stage.

8. The system of claim 1 and means comprising resonant transfer circuits for transmitting signals over said communication path, and means whereby the algebraic sum of currents from said biasing means equal zero.

9. The system of claim 8 and means whereby said algebraic sum is a linear function with respect to time.

10. The system of claim 8 and means whereby said algebraic sum is a linear function with respect to time at the middle of said resonant transfer circuit.

11. The system of claim 1 wherein said transistors are bilateral transistors.

12. The system of claim 1 and means comprising resonant transfer circuit for transmitting signals over said communication path, and means whereby the algebraic sum of the switching currents at one end of said communication path is equal to the algebraic sum of the switching currents at the other end of said communication path, said ends being separated by a high impedance branch.

References Cited by the Examiner

UNITED STATES PATENTS

| | | | |
|---|---|---|---|
| 2,936,338 | 5/1960 | James | 179—15 |
| 3,089,963 | 5/1963 | Djorup | 179—15 |

FOREIGN PATENTS

| | | |
|---|---|---|
| 841,555 | 7/1960 | Great Britain. |

OTHER REFERENCES

Van Nostrand, The International Dictionary of Physics and Electronics (page 75 relied on).

DAVID G. REDINBAUGH, *Primary Examiner.*